3,165,873
HAY CONDITIONER SUPPORTING AND
OPERATING MEANS
Wilhelm Iven, Roubaix, Nord, France, assignor to International Harvester Company, Chicago, Ill., a corporation of New Jersey
Filed Feb. 26, 1963, Ser. No. 261,089
4 Claims. (Cl. 56—1)

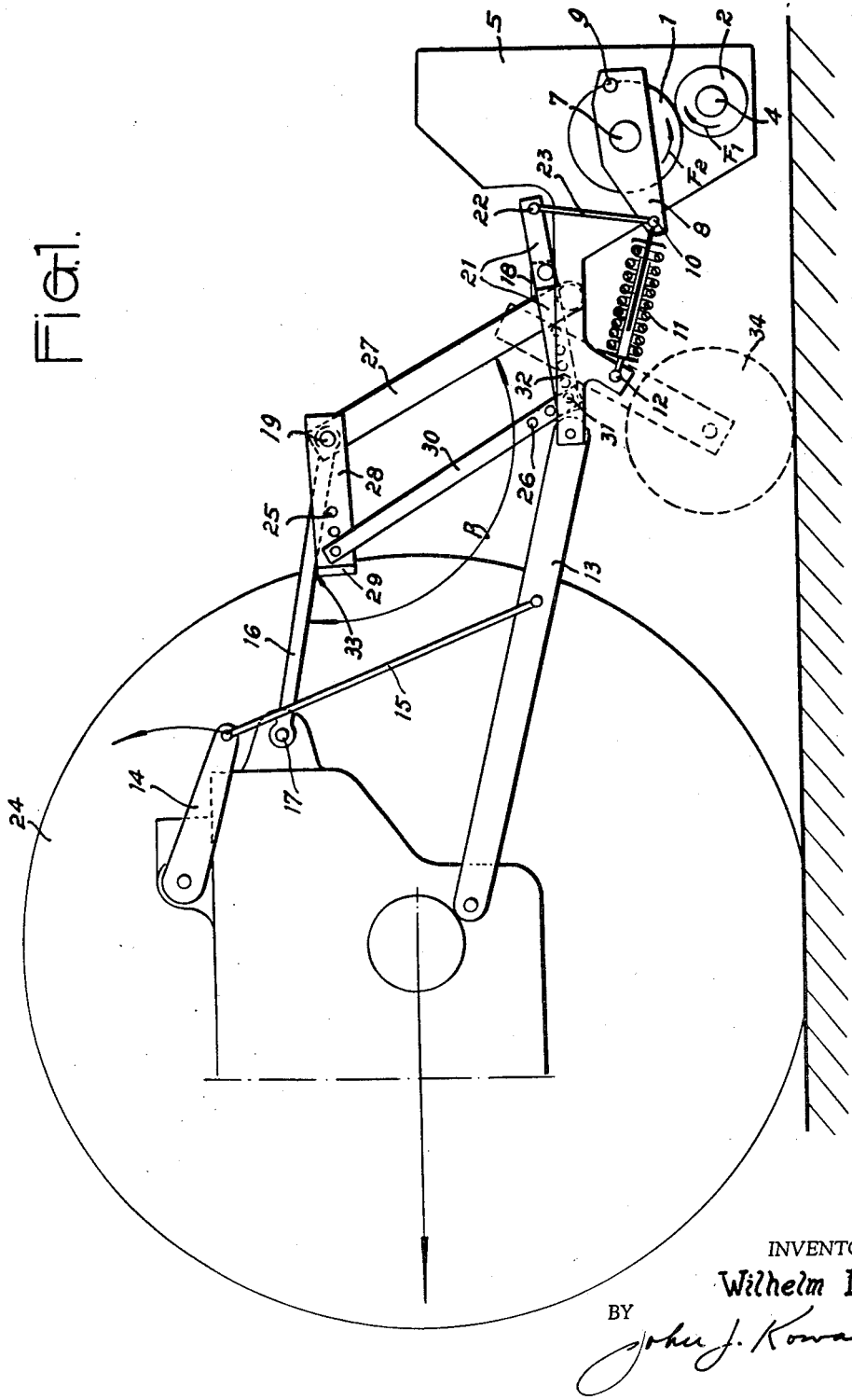

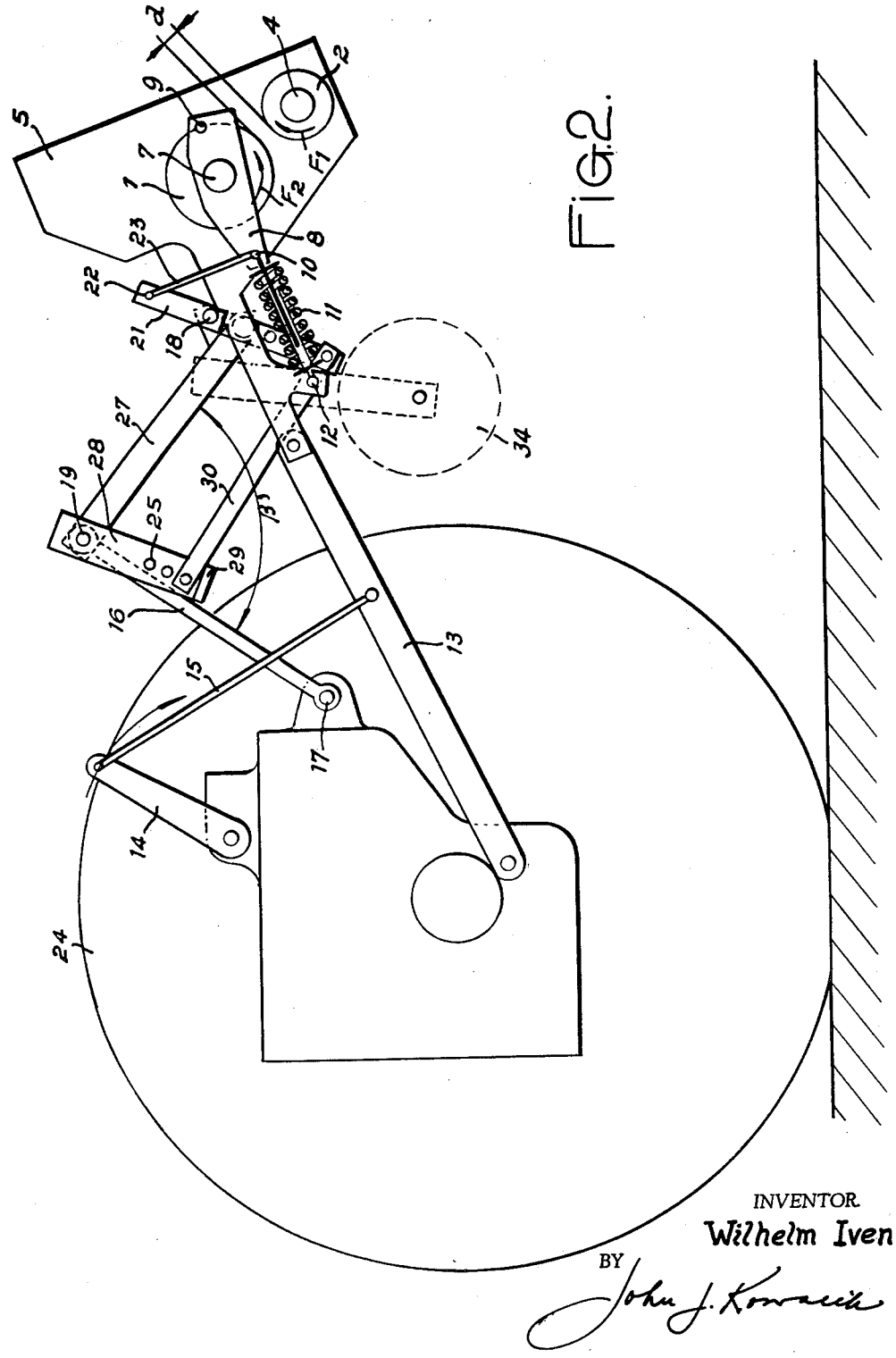

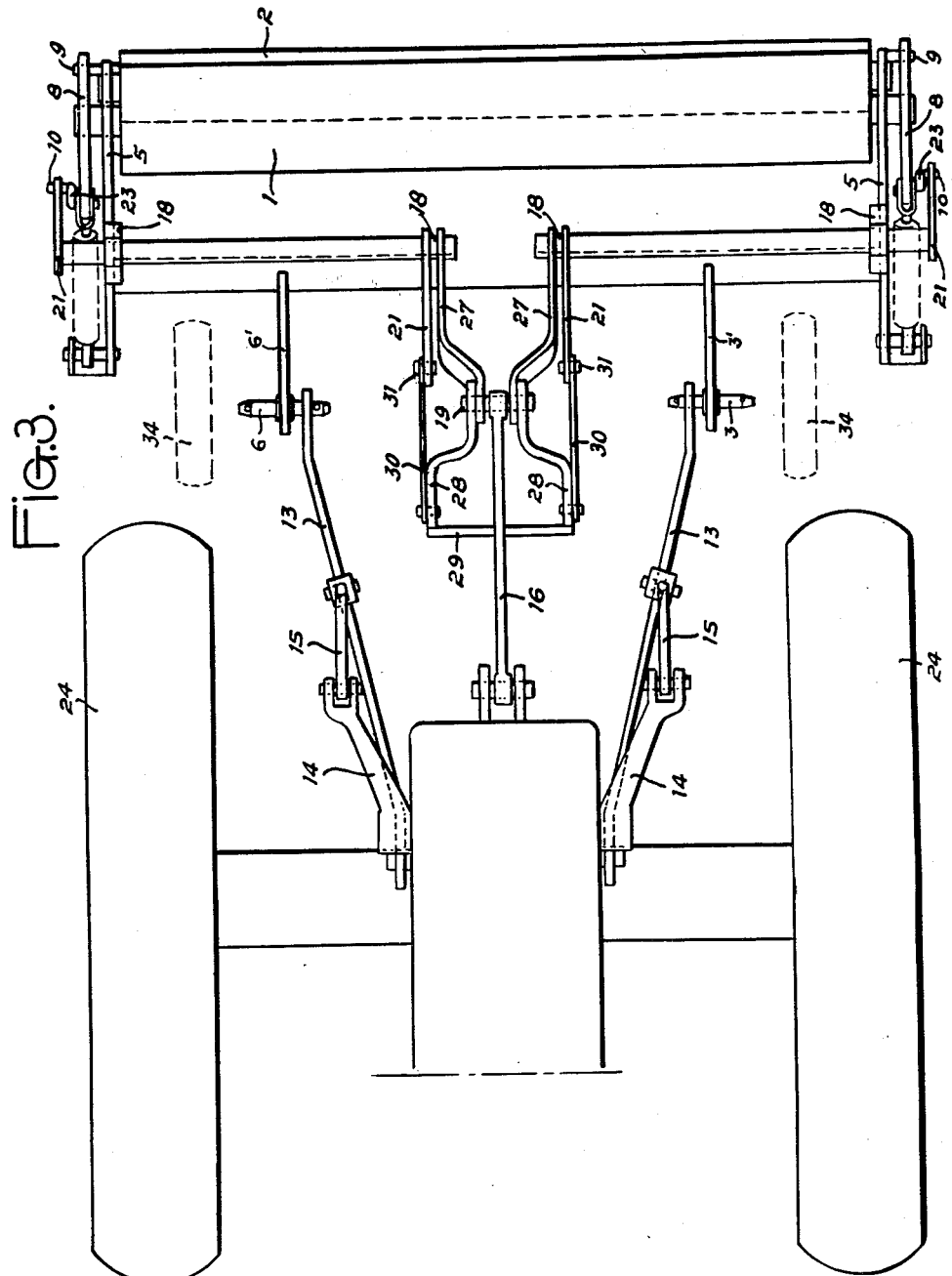

The present invention relates to a hay conditioner and more particularly to a novel means for spacing the rollers of an agricultural implement particularly, of a fodder splitter otherwise known as a hay conditioner.

The problem to be solved is to momentarily spread the rollers of a fodder splitter when these rollers are choked by an excess of material, so as to enable them to resume their rotation instantaneously.

More specifically, the present invention comprehends the provision of an abutment on the splitter which engages against the upper arm of the hydraulic lifting system of the tractor, the abutment being in the form of a stirrup member connected with guiding arms articulated through rods connecting with the lever forming part of the splitter, the lifting of the entire splitter unit having the effect of spacing the upper roller from the lower roller, through the mechanism heretofore described, and to enable rotation of both of these rollers, to be instantaneously resumed.

The invention further contemplates the provision of a stirrup member positioned beneath the upper arm and connected with guiding arms articulated through rods connecting with the lever forming a part of the splitter, the mounting being such that when the rollers are blocked or choked, the entire splitter unit is lifted, whereupon the stirrup abuts the upper arm and by means of the connecting rods, the upper roller separates from the lower roller.

Further features and advantages of the present invention will become clear from the following description given in connection with the accompanying drawings of one embodiment of the apparatus given by way of explanation and without any intention of limitation.

In these drawings:
FIGURES 1 and 2 are side elevation diagrammatic views of the hay conditioning device and of the hydraulic lifting device of a tractor, FIGURE 1 representing the fodder splitter in its lowermost position with its two rollers in contact, and FIGURE 2 representing this splitter in its uppermost position, with its two rollers spaced apart;
FIGURE 3 is a plan view corresponding to FIGURE 1.

The material to be split or conditioned is passed between two rollers 1 and 2. The lower roller 2 is rotated, in the direction of arrow F₁, about an axle journaled to the frame body 5.

The upper roller 1 is rotated, in the direction of arrow F₂, about an axle 7 secured at each end to an arm 8 (only one arm 8 can be seen in the figures). Such construction and the general structure of the unit is shown in U.S. Patent No. 3,039,256.

Each of these two arms 8 is pivoted at one end on a pin 9 integral with the frame 5. A compression spring 11 secured to or reacting against the frame 5 at a point 12 exerts a continuous load on the other end 10 of the respective arm 8, so that the upper roller 1 presses or is urged against or toward the lower roller 2 to crush the material to be processed.

The entire implement is raised by means of the hydraulic lifting arms of the tractor, viz. the lower draft arms 13 which are pivoted at their forward ends to the tractor and connected to the lifting arm 14 by connecting link 15, and by the upper arm 16 pivoted at 17 to the tractor, and by the lower pivots 3 and 6 and upper pivot 19 for the machine (the points 3, 6 and 19) embodying the three-point linkage). The points 3 and 6 are on arms 3', 6' connected to frame 5 of the apparatus. The reference 24 indicates the tractor's wheels.

Two rigid members 27 fixed to the frame 5 of the hay conditioner connect with the upper arm 16 of the three-point linkage through a pivot 19. The pivot pin 19 is of a length such that the right and left-hand members 27 as well as the rear ends of guiding arms 28 are pivotally supported by said pivot 19. These arms 28 are connected at their forward ends by a stirrup 29 and form therewith a rigid unit.

At the fore part of arms 28 are pivoted two connecting rods 30, left-hand and right-hand respectively, having their ends mounted, through pins 31, in one of the holes 32 in the side of levers 21.

Several of such holes (25-26) in members 28, 21 are provided thus enabling the device to be mounted on three-point linkages of various makes, this constituting one of the advantages of the present invention.

The device according to the present invention operates as follows:
FIGURE 1 shows the splitter in the working position. There is therefore a slight clearance at 33 between the underside of the upper arm 16 of the three-point linkage and the upper edge of stirrup 29 which provides a reactive engagement means against the arm 16. Each rigid member 27 thus makes a certain angle B with the upper arm 16.

When rollers 1 and 2 become blocked or choked, the machine is lifted and: at the very moment that the arms 14 of the tractor hydraulic system lift, stirrup member 29 contacts the upper arm 16. Then the further lifting actuates all of the levers starting with the upper arm of the three-point linkage (FIGURE 2). Angle B decreases and assumes the value B'. Stirrup 29 is biased downwards owing to the new position of the upper arm 16, and, through connecting links 30, the bellcrank levers 21 which are mounted via bearings 18 from the frame 5, are actuated and act on the movable arms 8 in such a way by lifting through lines 23 that the rollers 1 and 2 separate from each other by a distance d.

As the implement is lowered, the rollers are once again engaged due to the bias of springs 11 and reverse movement of the linkage and normal operation can be resumed with wheels 34 on the ground.

It is to be understood that the foregoing description of the present invention has been given by way of explanation and without any intention of limitation, and that modifications of detail can be made thereto without exceeding its scope.

What is claimed is:
1. A combination with a tractor having a three-point hitch including lower draft arms pivotally mounted thereto and an upper link for vertical swinging movement, a frame, a hay conditioning device comprising a pair of hay conditioning rolls, means including yieldable means supporting said rolls from the frame in cooperative relation and for movement relative to each other, means including pivot connections between said frame with said arms and link for jack-knifing action, and operating linkage comprising lever means pivoted to the connection between said frame and said link and having a portion reactably engaging said link and having another portion operatively connected to said first-mentioned means for automatically moving said rolls toward each other attendant to lowering of said device through downward swinging movement of the link and separating the rolls through upward swinging of the link when the device is elevated.

2. The combination with a three-point hitch having an upper link and a pair of rearwardly extending vertical swingable draft arms, a hay conditioning device comprising a frame pivotally connected to said draft arms for swinging movement about a substantially horizontal transverse axis, means connecting said frame with said link for controlling the attitude of said device with respect to the ground, said device comprising a pair of hay conditioning rolls, mounting means rotatably supporting said rolls on said frame transversely of the direction of movement of the device in cooperative relation and for relative movement and developing a forwardly open bite and movable vertically relative to each other for opening and closing said bite, and means including lever means having a reaction engagement with said link and a connection with said mounting means for coincidentally opening the rolls upon elevation of the device by said arms and closing the rolls upon lowering of the device by said arms.

3. A crop pick-up and conditioning device comprising a frame, a pair of superposed crushing rolls carried on the frame transversely of the direction of movement of the device and forming a forwardly open bite, one of said rolls movable with respect to the other to open and close the bite, three-point hitch means including an upper link carrying said device, and means operatively interconnecting said upper link with said movable roll comprising a spring actuated toggle linkage operative between the frame and movable roll, and toggle release means connected between said linkage and said upper link and comprising lever means pivoted intermediate its ends on the frame and having one end abutting said upper link and another connected with said toggle linkage.

4. The combination with tractor mounted draft means including rearwardly extending draft arm means and upper link swingable vertically for elevating and lowering an associated implement, a hay conditioning device having a frame pivotally mounted on said draft arm means and having a vertically offset pivotal connection with the upper link for jack-knifing movement with respect thereto, said device including a pair of hay conditioning rolls cooperatively arranged and relatively movable to close and open the spacing therebetween, and means including a lever pivotally mounted on one point at the connection between said frame and said link and having a portion spaced forwardly from the point underposed with respect to said link and linkage extending from the lever to adjacent said rolls, and means comprising a yieldable element operatively interconnecting said linkage with at least one of said rolls for moving the same toward and away with respect to the other roll upon and coincidental with lowering and elevation of said device through said draft means.

References Cited in the file of this patent

UNITED STATES PATENTS

| | | |
|---|---|---|
| 2,415,156 | Arps | Feb. 4, 1947 |
| 2,712,358 | Kuhary et al | July 5, 1955 |
| 2,932,143 | Morkoski | Apr. 12, 1960 |
| 2,989,829 | Heth et al. | June 27, 1961 |
| 3,039,256 | Witt | June 19, 1962 |